Patented Nov. 8, 1938

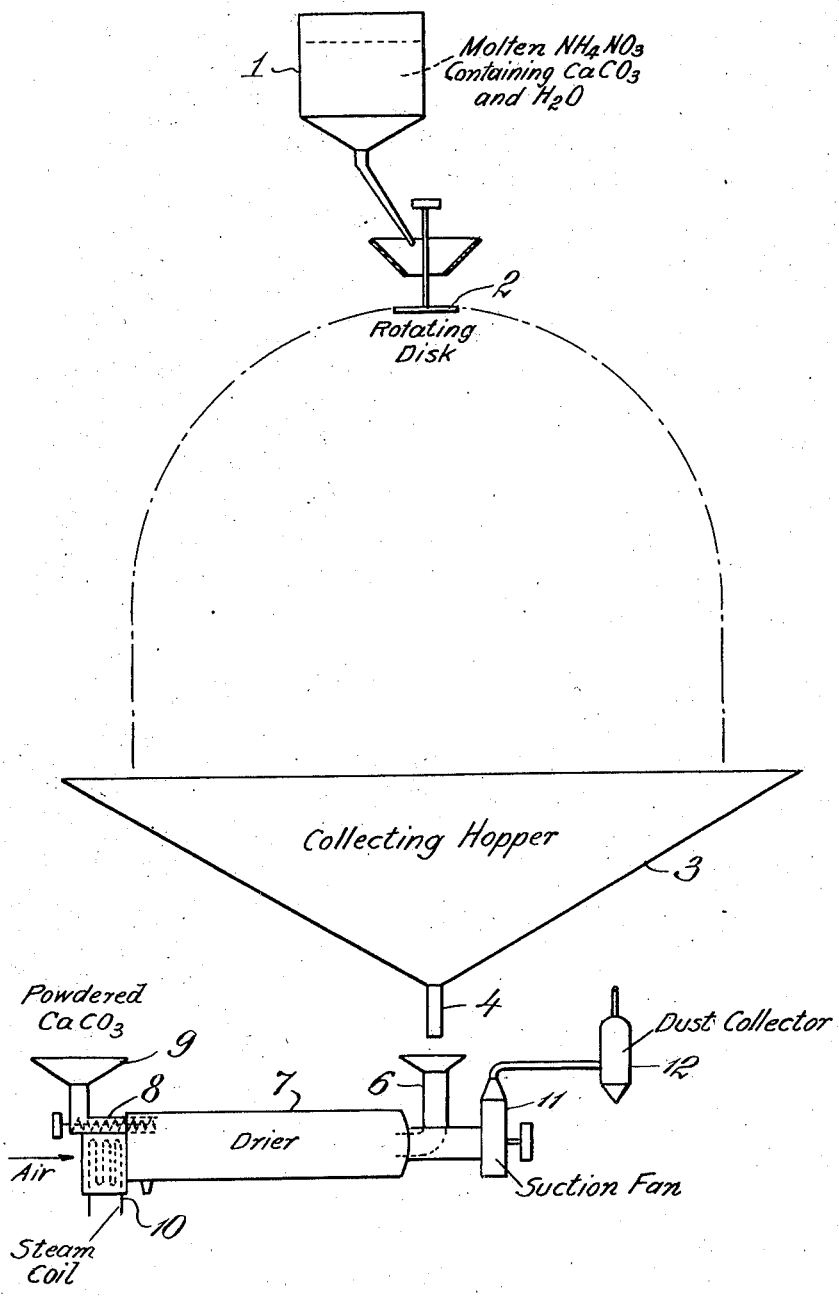

2,136,069

UNITED STATES PATENT OFFICE 2,136,069

PROCESS FOR PRODUCING GRANULAR FERTILIZERS

Herman A. Beekhuis, Jr., Petersburg, Va., assignor, by mesne assignments, to The Solvay Process Company, New York, N. Y., a corporation of New York Application June 5, 1934, Serial No. 729,087

10 Claims. (Cl. 71—60)

This application is a continuation in part of my copending United States application, Serial No. 521,482, filed March 10, 1931.

This invention relates to a process for the preparation of granular, non-caking fertilizers from fusible materials such as ammonium nitrate which are hygroscopic and, when in ordinary crystalline form, exhibit a marked tendency to absorb moisture from the air and to cake together. The invention further relates to the granular products obtained from the process herein described.

It has heretofore been proposed to prepare a mixture of fused ammonium nitrate and finely divided calcium carbonate and to disperse the mixture at a temperature at which it is relatively fluid in the form of droplets into a cooling gas to solidify the material in the form of small granules. While the granular product thus obtained is much more satisfactory for use as a fertilizer than ammonium nitrate alone, since the granules of ammonium nitrate-calcium carbonate exhibit a less tendency to cake, nevertheless this composition is not entirely satisfactory for storage during prolonged periods of time since, when exposed to an atmosphere of relatively high humidity, it absorbs moisture and cakes together to a considerable degree so as frequently to require mechanical disintegration before it may be distributed in the field.

The present invention has for objects, among others, the provision of a novel granular fertilizer product which has a relatively low hygroscopicity and exhibits a remarkable resistance to caking when stored for long periods of time at ordinary atmospheric conditions, and the provision of processes for preparing these fertilizer products.

In carrying out the process of this invention, a mixture of a fertilizer material such as ammonium nitrate and a finely divided inert solid such as calcium carbonate heated to a temperature at which the ammonium nitrate is fused, is comminuted and cooled to form solid granular particles. The comminution may precede or follow the solidification of the fused mixture. Thus, the fused mixture may be dispersed as droplets into a cooling gas and the droplets solidified in the form of small pebbles. If desired, the fused mixture may be cooled as, for example, in the form of a thin layer on the surface of a rotating drum from which the solidified material may then be lifted by scrapers and broken into flakes. In whatever manner the solid granules of ammonium nitrate and calcium carbonate are formed, the granules are mixed with finely divided inert solid material which is preferably the same inert solid as was incorporated in the fused mixture from which the granules were prepared. The mixture of granules and solid inert material is maintained at a temperature at which the exterior of the granules softens sufficiently for the finely divided solid to adhere thereto and form a surface coating on the granules. After receiving a coating of the finely divided inert solid, the granules may then be cooled and are ready for packaging and storage or shipment. The presence of moisture in the granules during treatment with the finely divided inert solid facilitates the formation of the desired coating. Accordingly, in the preferred embodiment of this invention the original fused mixture contains some water, so that the granules formed therefrom contain above about .25% moisture. The granules containing this proportion of moisture are treated with the finely divided inert solid and are dried so that the final coated product contains below about .25% moisture. The amount of finely divided inert solid which may be applied to the granules as coating may be varied within relatively wide limits. In general, the granules should be mixed with about 2% or more of their weight of the finely divided inert material. The amount of solid retained as a coating upon the granules may amount to about 1% or more, and preferably to about 5% of the total weight of the coated material. Under some circumstances it is desirable that the proportion of finely divided material forming the coating on the granules should amount to substantially more than that indicated above.

The product of this invention will consist of a mass of discrete granules which, when fractured, will show an interior body constituting the large proportion of the total in which the finely divided solid material is substantially uniformly dispersed throughout a mass of the ammonium nitrate or other originally fused material which has become solidified from the fused state. About this central mass of the granules there will be observed a relatively thin surface layer or coating containing a much higher proportion of the solid finely divided inert material. Some of this finely divided material of the coating is imbedded in the outer portions of material which is solidified from the fused state and another portion will be found firmly adhering to the surface of this solidified fusion.

The following examples are illustrative of the processes and products of this invention. The accompanying drawing illustrates one type of apparatus suitable for carrying out the invention, particularly by the procedure described in Example I below.

*Example I.*—A 90% ammonium nitrate solution is heated to a temperature of 100° to 105° C. and finely divided calcium carbonate is mixed with the fused ammonium nitrate in the proportions of about 80 pounds of the calcium carbonate to every 100 pounds of the ammonium nitrate solution. The mixture is stirred to maintain the calcium carbonate in suspension in the fused ammonium nitrate and, at the above temperature of 100° to 105° C., is dispersed into a cooling gas in the form of more or less spherical particles. With reference to the accompanying drawing, the mixture of ammonium nitrate and calcium carbonate in a vessel 1 is maintained at a temperature of 100° to 105° C. and flows at that temperature from vessel 1 to a rotating disc 2 from which it is dispersed into the air as a cooling gas. These spherical particles are allowed to fall through the cooling gas for such a distance that they are sufficiently solidified to retain their shape upon being collected and passed into a rotary drier by means of collecting hopper 3, the walls of which direct the collected particles to a pipe 4 through which they pass into a pipe 6 leading into a drier 7. The thus solidified material will contain about 50% ammonium nitrate, about 45% calcium carbonate, and about 5% moisture coming from the water in the ammonium nitrate solution used in making up the fused mixture.

Simultaneously with the feeding of the granules into the rotary drier there is also fed into the drier about 2% of the weight of the granules of finely divided calcium carbonate, such as pulverized limestone by means of a screw conveyor 8 which is fed with the pulverized limestone from a hopper 9. In the rotary drier the granules are agitated and treated with air heated by means of a steam coil 10 and drawn through the drier by means of suction fan 11, which serves to dry the granules while they are mixed with the finely divided calcium carbonate until the material contains not more than about 0.25% moisture. The air may be introduced into the drier at a temperature of from 50° to 120° C. The finely divided calcium carbonate may be fed to the rotary drier by suspending it in the air passed into the drier employing the apparatus shown in the drawing. It is preferable, however, to feed the calcium carbonate into the drier simultaneously with and at the same end of the drier to which the moist granular material is fed since by so doing the finely divided calcium carbonate and moist granules are mixed in mass and an increased proportion of the calcium carbonate adheres to and coats the granules. In thus operating, instead of the screw conveyor 8 being positioned at the air intake end of the drier as shown in the drawing, the end of this conveyor is positioned to discharge into pipe 6 so that the finely divided calcium carbonate travels into the drier with the pebbles coming from collecting hopper 3. Under such conditions most of the calcium carbonate adheres to the granules in the drier to form a surface coating thereon. The small amount of the finely divided material, which is carried out of the drier with the air, may be recovered as, for example, in a dust precipitator 12. Any dust thus recovered may be returned to the process for mixture with ammonium nitrate and more limestone in preparing the granulated product by spray cooling a melt of the mixture. In thus treating granules of ammonium nitrate-calcium carbonate with finely divided calcium carbonate, a pebbled product having a materially lessened tendency to cake during storage, is obtained than a similar product not coated as in the foregoing process. The addition of the finely divided calcium carbonate to the material in the drier also has an added advantage in that the pebbled material fed to the drier has a tendency to adhere to the walls of the drier and to form relatively large lumps. This tendency of the material to cake during drying and to adhere to the sides of the drier is substantially completely overcome by introducing calcium carbonate into the drier at the same time that the granules are passed thereinto.

*Example II.*—A mixture of 90% ammonium nitrate solution and finely divided calcium carbonate in the proportions of about 150 pounds of calcium carbonate to every 100 pounds of ammonium nitrate solution is heated and pebbled at a temperature of about 100° to 105° C. as in the process of Example I. The solidified pebbled particles are passed into a rotary drier where they are mixed with finely divided calcium carbonate and treated with warm air to coat and dry the particles.

*Example III.*—A melt of ammonium nitrate containing about 95% ammonium nitrate and 5% water is mixed at a temperature of about 120° C. with powdered limestone. The limestone at atmospheric temperatures is introduced into the ammonium nitrate melt in the proportions of about 43 parts of limestone to about 47 parts of ammonium nitrate, calculated on the basis of anhydrous ammonium nitrate. After mixing the foregoing materials, the mixture having a temperature in the neighborhood of 110° C. is distributed in a thin layer on a cooled rotating drum and the solidified material removed from the drum surface by means of a scraper which breaks the material into flakes. The granules of flaked material are passed directly into a rotary drier and treated with heated air until they contain about 0.4% moisture. The thus partially dried granules are then introduced into a rotating drum together with about half their weight of finely powdered limestone. The mixture of granules and limestone is tumbled in the drum at a temperature of about 100° C. to give the granules a surface coating of limestone. After further treating the mixture of granules and limestone with heated air to dry it until its moisture content is reduced to below 0.25%, for example to about 0.1%, the granules are separated from the excess limestone by screening.

While in the foregoing examples the process of this invention has been particularly described in conjunction with the preparation of mixtures of ammonium nitrate and calcium carbonate, the invention is not limited thereto. It contemplates the preparation of fertilizers consisting of solidified fusions of mixtures of fusible fertilizer materials other than ammonium nitrate with other finely divided solid inert materials than calcium carbonate, such as pulverized dolomite, finely divided sand, pulverized marl or oyster shells which exhibit a marked tendency to absorb moisture and cake during storage. For example, fertilizers employing urea instead of ammonium nitrate may be prepared in accordance with this invention. Thus, a mixture of molten urea, containing about 95% urea and 5% water, with ground limestone in the proportions of about 55 parts of limestone for every 45 parts of urea, may be prepared and solidified in the form of solid granules. These granules may be partially dried so as to leave about 0.4% moisture in them and the granules may then be introduced into a rotating drum together with about half their weight of finely powdered limestone. The mixture of granules and limestone is tumbled in the drum at a temperature of about 100° C. to give the granules a coating of limestone. The mixture of granules and excess limestone next passes to a second rotary drier where, by means of heated air, the moisture content is reduced to about 0.1%. The granules are separated from the excess limestone by screening, and the fines may be returned for mixture with urea in preparing additional material for granulation. Under the specified conditions, the limestone forms a substantially uniform, adherent coating on the surfaces of the granules. This coating of the granules with finely divided limestone improves the storage properties of the granules. This is believed due to the tendency of the urea to migrate to the surface of the granules during their drying treatment. By applying the coating to the granules the tendency of any surface layer of urea to cause the caking of the granules during storage is repressed.

When calcium carbonate is employed as the inert solid material in preparing the fertilizers of this invention, it may be in the form of pulverized limestone or precipitated calcium carbonate. Calcium carbonate or dolomite, however, are preferred to materials such as sand, since they act not only to reduce the caking of the material of the mixture but also, when included in a fertilizer, act as a soil conditioner.

In coating the granules of material with limestone or other finely divided solid inert material, the surface of granules while agitated with the solid material should be sufficiently plastic so that the solid is bound to the granules prior to the drying and the coat is firmly retained by crystallization of some ammonium nitrate in the coat. The plasticity of the granule surface increases as the temperature of the granules is raised or as their moisture content is increased. The portion of solid retained as a coating on the final product, accordingly, varies with the moisture content and with the temperature at which the granules are heated while being mixed with the finely divided solid. In general, therefore, the conditions of temperature and moisture content of the granules treated with the solid in accordance with this invention is such that a desired amount of solid is retained on the granules as a surface coating. In general, this may be accomplished by treating granules containing from 0.1% to 1% moisture with the solid at temperatures of 90° C. to 120° C. or by treating granules containing an increased proportion of moisture at correspondingly lower temperatures.

While a product of improved characteristics results when the granules are coated with an amount of the finely divided solid corresponding to about 1%, or even somewhat less, of the weight of the granules, it is preferred that the granule coating material amount to about 5% or more of the total granule weight.

Since certain changes in carrying out the above process and certain modifications in the composition which embody the invention may be made without departing from the scope of the invention, it is intended that all matter contained in the above description shall be interpreted as illustrative and not in a limiting sense. The fertilizer product described may be admixed with other ingredients if desired or may be applied alone to the soil.

I claim:

1. The process for preparing fertilizers which comprises forming a mixture of ammonium nitrate and an inert finely divided solid material containing a small proportion of moisture into granules, mixing said granules with finely divided inert solid material and drying the mixture of granules and inert solid material while heating it to a temperature at which the exterior of the granules softens and there is formed on the granules an adhering surface coating of the last mentioned inert solid material.

2. The process for preparing a granular ammonium nitrate fertilizer which comprises mixing with an inert finely divided solid material, granules prepared by solidifying a melt of ammonium nitrate and inert finely divided material, said granules containing more than 0.25% moisture, agitating the resulting mixture at a temperature at which the exterior of the granules softens and there is formed an adhering coating of inert solid material on said granules, and drying the granules prior to discontinuing agitating them with the inert finely divided solid material.

3. In a process wherein a granular ammonium nitrate-calcium carbonate fertilizer containing moisture is prepared, that improvement which comprises mixing with the granules of said fertilizer containing more than .25% moisture finely divided calcium carbonate, heating said mixture while agitating it to a temperature at which the exterior of the granules softens and a portion of said finely divided calcium carbonate becomes imbedded in the outer portions of the granules and another portion adheres to the surface thereof and during the heating of the mixture drying it until the moisture content of the granules is reduced to below .25% and a firmly adhering surface coating of said finely divided calcium carbonate is formed on said granules.

4. The process for preparing granular fertilizers which comprises heating a mixture of ammonium nitrate, an inert finely divided solid material, and water to a temperature at which a fluid melt containing said inert solid material dispersed throughout a fusion of said ammonium nitrate is formed, comminuting and solidifying the melt to form granules, mixing the granules while they still contain above .25% moisture with about 2% or more of a finely divided inert solid material and heating the mixture of granules and inert solid material to a temperature at which the exterior of the granules softens while drying the mixture until the moisture content of the granules is reduced to below .25% and there is formed on the granules an adhering surface coating of said last mentioned inert solid material.

5. In a process for producing a fertilizer in which moist granules comprising an intimate mixture of ammonium nitrate and an inert solid are treated with heated air to dry the granules, the improvement which comprises treating said moist granules with heated air carrying finely divided solid material in suspension therein while agitating the granules to prevent them from sticking together.

6. The process of producing a granular fertilizer which comprises preparing a fluid mixture containing ammonium nitrate and an inert solid in finely divided form, dispersing said fluid mixture in the form of separate particles and solidifying said particles by means of a cooling gas, and treating the solidified particles with heated air carrying in suspension a quantity of said inert solid in a finely divided form.

7. The process of producing a granular fertilizer which comprises preparing a fluid mixture containing ammonium nitrate and an inert solid in finely divided form, dispersing said fluid mixture in the form of separate particles and solidifying said particles by means of a cooling gas, and treating the solidified particles with a hot gas carrying in suspension a quantity of inert solid in a finely divided form.

8. The process of producing a granular fertilizer which comprises preparing a fluid mixture of ammonium nitrate and finely divided calcium carbonate, dispersing said fluid mixture in the form of separate particles into a cooling gas, solidifying said particles during their travel through said gas, passing said solidified particles in countercurrent flow with air heated to a temperature of 50° to 120° C. prior to introduction of the same into contact with said particles, and introducing into said air prior to its contact with the solidified material calcium carbonate dust.

9. The process of producing a granular fertilizer which comprises preparing a fluid mixture containing ammonium nitrate and an inert solid in finely divided form, dispersing said fluid mixture in the form of separate particles into a cooling gas, solidifying said particles during their travel through said gas, and treating the solidified particles with heated air carrying calcium carbonate dust in suspension therein.

10. The process of producing a granular fertilizer which comprises preparing a fluid mixture containing ammonium nitrate and finely divided calcium carbonate, dispersing said fluid mixture in the form of separate particles into a cooling gas, solidifying said particles during their travel through said gas, and treating the solidified particles with heated air carrying calcium carbonate dust in suspension therein.

HERMAN A. BEEKHUIS, Jr.